June 1, 1971 R. W. DENNISON ET AL 3,582,484
CONTINUOUS PRODUCTION OF DIESTERS
Filed Feb. 14, 1969 3 Sheets-Sheet 1

INVENTORS
RONALD WILLIAM DENNISON
FRANK STANLEY HOLLAND

BY
Cushman, Darby & Cushman
ATTORNEYS

United States Patent Office 3,582,484
Patented June 1, 1971

3,582,484
CONTINUOUS PRODUCTION OF DIESTERS
Ronald William Dennison and Frank Stanley Holland, Manchester, England, assignors to Imperial Chemical Industries Limited, London, England
Filed Feb. 14, 1969, Ser. No. 799,459
Claims priority, application Great Britain, Feb. 28, 1968, 9,633/68
Int. Cl. C07b 29/06; C07c 69/34
U.S. Cl. 204—79       11 Claims

ABSTRACT OF THE DISCLOSURE

Continuous production of aliphatic dicarboxylic esters by electrosynthesis from monoesters of shorter chain aliphatic dicarboxylic acids. Product is continuously removed from the electrolysis zone, e.g. by extraction with hydrocarbon solvent, and anhydride of the shorter chain aliphatic dicarboxylic acid is continuously added to react with alcoholic solvent and thereby maintains a steady concentration of monoester.

---

This invention relates to a process for the continuous production of diesters of aliphatic dicarboxylic acids.

It is known to electrolyse salts of monoesters of aliphatic dicarboxylic acids and thereby produce, by an adaptation of the Kolbe synthesis, diesters of aliphatic dicarboxylic acids having chains of methylene groups twice as long as those in the starting materials. Thus dimethyl sebacate has been made from a salt of methyl hydrogen adipate, dimethyl adipate from a salt of methyl hydrogen succinate, and dimethyl suberate from a salt of methyl hydrogen glutarate. Best yields are known to be obtained when the monoester in the electrolyte is not fully neutralised to form a salt, that is to say when the electrolyte is acidic. It is also known that certain hydrocarbon solvents can be used to extract the diester product from the electrolyte.

According to the invention a process for the continuous synthesis of a product consisting of a diester of an aliphatic dicarboxylic acid having a chain of carbon atoms between its carboxylic groups comprises electrolysing an alcoholic solution containing a monoester of an aliphatic dicarboxylic acid of lower molecular weight having between its carboxylic groups a chain of carbon atoms half as long as the chain in the product and a salt of said monoester, isolating product from the electrolyte in an isolation zone, returning alcohol and salt constituents of the electrolyte from the isolation zone to the electrolysis zone and continuously introducing into the electrolysis zone an anhydride of the said dicarboxylic acid of lower molecular weight to react with the alcohol and thereby maintain in the electrolyte a steady concentration of the monoester and salt thereof.

Anhydrides which may be used in the process of the invention include succinic, glutaric and adipic anhydrides as well as the anhydrides of longer chain aliphatic dicarboxylic acids. The preferred anhydrides are the cyclic anhydrides, e.g. those of succinic and glutaric acids.

Preferred alcohols for use as electrolyte solvents are the lower aliphatic alcohols especially methanol, ethanol and isopropanol. Methanol is particularly preferred.

Monoesters present in the electrolyte when the process is running under steady conditions are those derived from the anhydride and the solvent alcohol but in starting up the process an ester of a different alcohol may be used if desired.

Salts of the half esters are preferably alkali metal salts especially sodium or potassium salts. If desired however other salts may be used for example salts with strong organic bases.

The conditions necessary to effect electrolysis are those known already in the art for Kolbe synthesis of dicarboxylic acid esters.

Anodes employed in the process may, for example, be made of bright platinum or smooth graphite.

Cathodes may, for example, be made of conducting metal, e.g. stainless steel, nickel, copper, lead or platinum, or of graphite.

Good results are obtained by the use of cell voltages of 2 to 16 volts and current densities of 0.01 to 1 amp per square centimetre. It is advantageous to operate at high temperatures, for example 40 to 100° C. When the alcohol used as electrolyte solvent is low boiling e.g. methanol a closed cell should be used, surmounted by a reflux condenser to return vaporised alcohol to the cell.

Preferred molecular ratios of monoester to salt in the alcoholic solutions are from about 20:1 to about 1:1, and especially from 2:1 to 1:1.

At the preferred ratios and preferred operating temperatures the production of low molecular weight diester directly by reaction of the anhydride and alcohol is minimal and the process of producing the required diesters continuously may be operated for long periods of time.

Isolation of product diester from the electrolyte may conventionally be carried out by evaporation of the alcohol followed by retraction with a hydrocarbon solvent, for example an aliphatic hydrocarbon of 5 to 10 carbon atoms or a cycloaliphatic hydrocarbon of 5 to 8 carbon atoms. n-Hexane and cyclohexane are suitable solvents. The commercially available mixtures known as petroleum ethers may also be used. When the invention is carried out in this way, unextracted residues which are not soluble in hydocarbon solvents are recycled to the electrolysis.

In certain cases, when the alcohol and hydrocarbons are not miscible (e.g. methanol and cyclohexane) isolation of the product may be carried out by direct extraction of the electrolyte with hydrocarbon solvent.

Apparatus suitable for carrying out the process of the invention will now be described with the aid of the accompanying drawings in which FIGS. 1 to 4 show an electrolytic cell and FIGS. 5 and 6 show a complete apparatus. More particularly, FIG. 1 is a vertical axial section of the cell.

Figure 1:
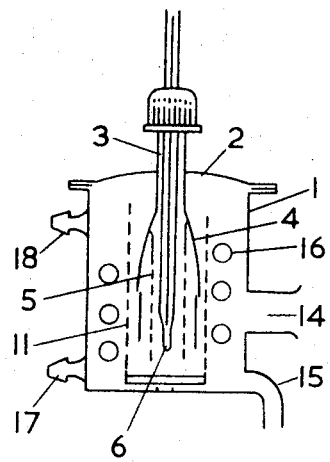

The electrolytic cell comprises a squat cylindrical container 1 fitted with a lid 2 which carries a central glass structure 3 supporting a cylindrical anode 4 and an inner cylindrical mesh cathode 5. A thermometer 6 is also supported centrally by 3. Spaced around 3 are a socket 7 for a reflux condenser, an anode connection 8 and an inlet 9 for recycled liquor this also serving as a cathode connection point. At the base of the container 1 is a support tray 10 which contains a magnetic stirrer (not shown) and holds up an outer cylindrical mesh cathode 11. The vessel has an inlet point 12 for anhydride and diametrically opposite to this and at a slightly lower level an overflow outlet for electrolyte. A sample point is provided at 14 and a drainage means at 15. A heating coil 16 with inlet and outlet at 17 and 18 surrounds the cylindrical electrodes 4, 5 and 11.

Figure 2:
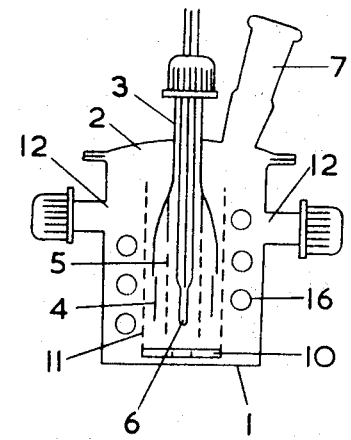
FIG. 2 is a vertical axial section of the cell in a plane at right angles to that of FIG. 1.
Figure 3:
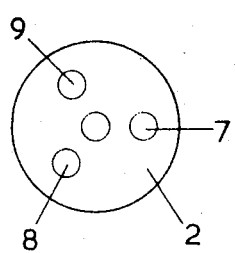
FIG. 3 is a top view of the lid of the cell.
Figure 4:
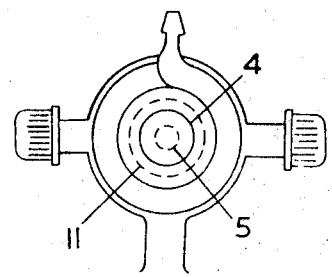
FIG. 4 is a horizontal section of the cell on the line IV—IV (FIG. 2).
Figure 5:
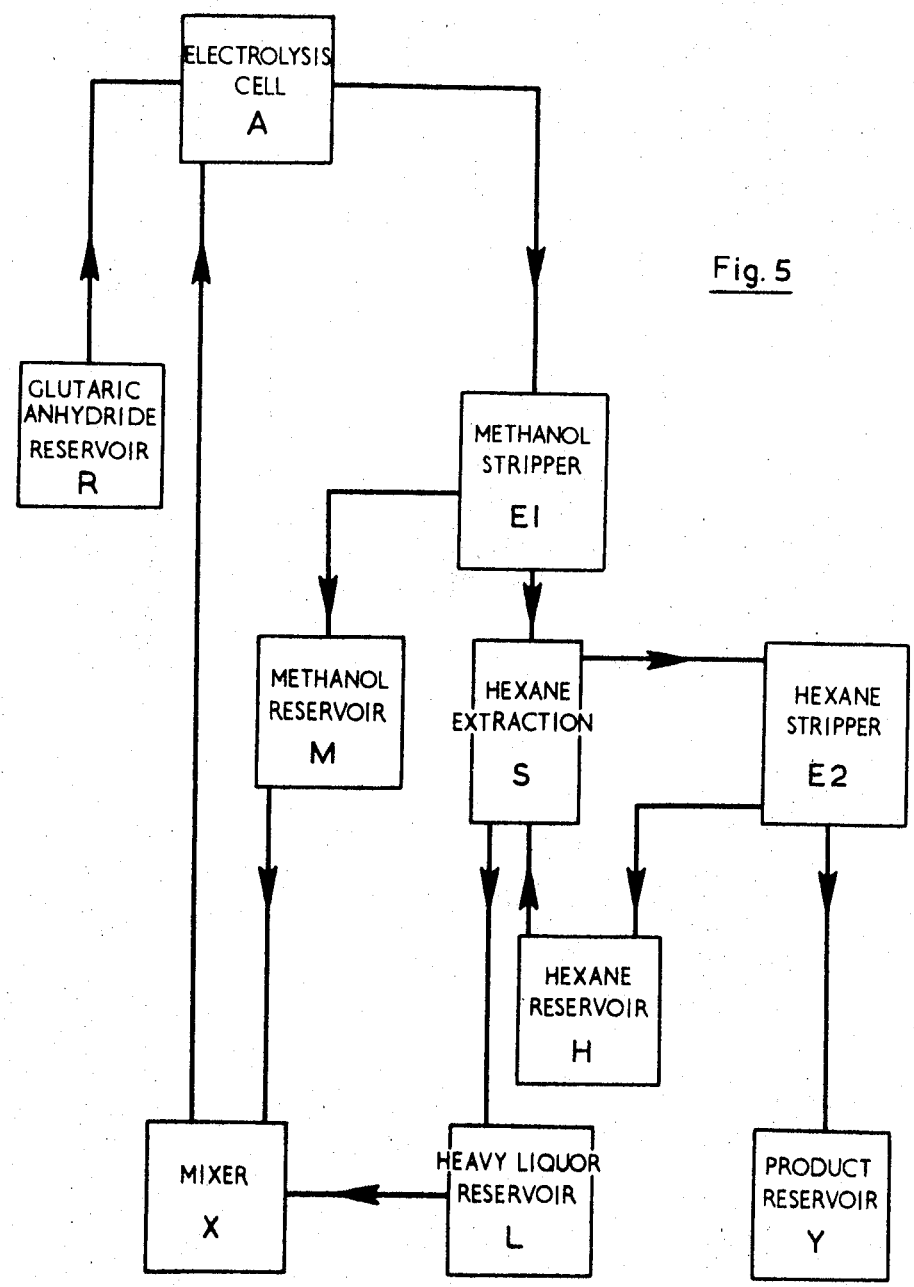
FIG. 5 is a flow diagram.
Figure 6:
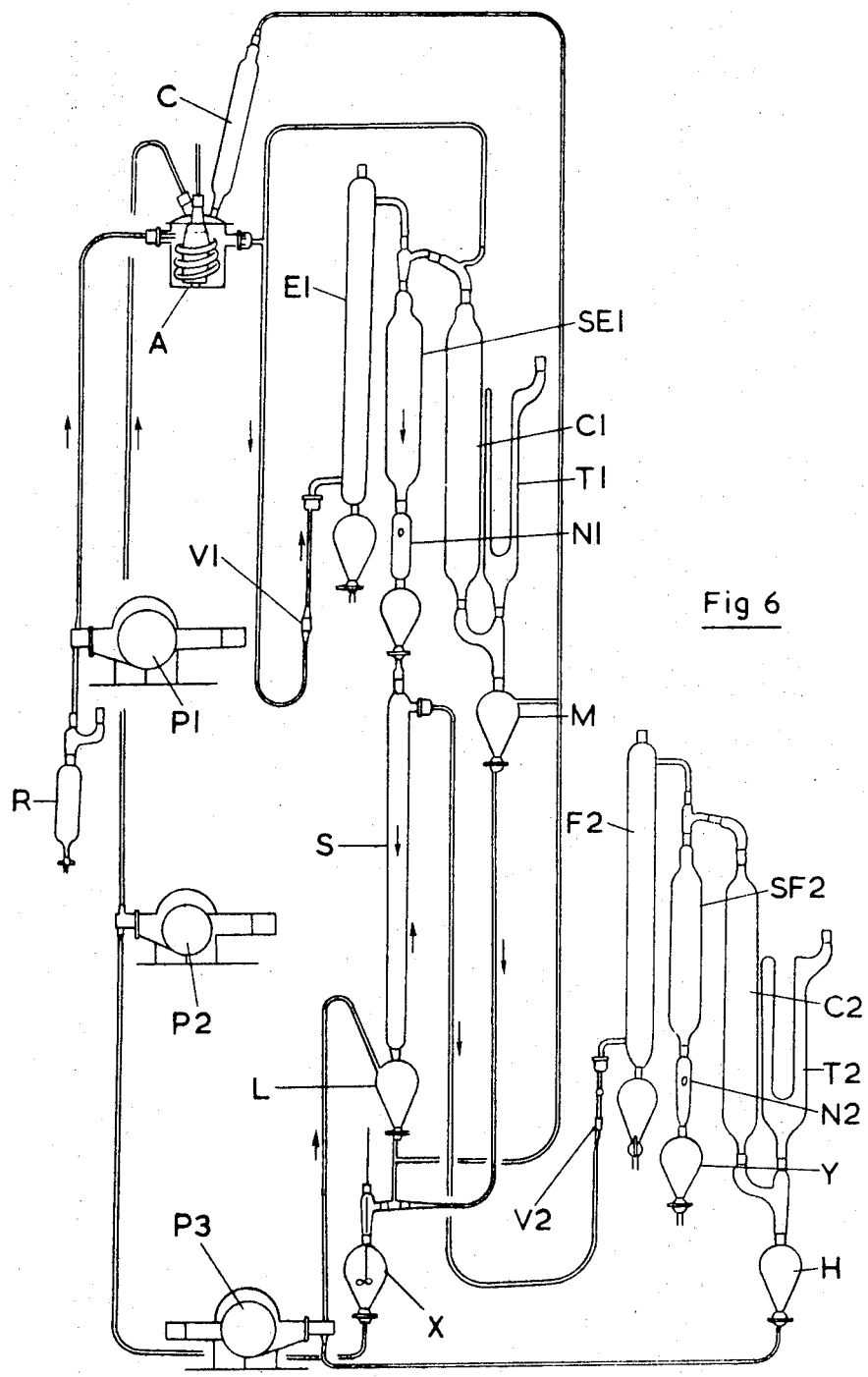
FIG. 6 is an illustration of a laboratory apparatus.

In FIGS. 5 and 6 the cell, represented generally at A is connected through 12 (FIG. 2) with a reservoir R from which anhydride may be passed by means of a pump P1 (FIG. 6). Outlet 16 of the cell is connected through a nonreturn valve V₁ to a methanol stripper E comprising a climbing film evaporator E1 and a subsidiary evaporator SE1 into which a stream of nitrogen is injected through N1. Evaporated methanol from the stripper is condensed in condenser C1 and $CO_2$ trap T1 to be collected in the methanol reservoir M. Unevaporated constituents of the electrolyte pass from the methanol stripper, into a ring-packed extractor S in which they encounter a stream of hydrocarbon solvent from reservoir H. Unextracted heavy liquor from S passes into reservoir L from whence it passes (together with methanol coming from M) into a mixer X. From X the mixture is passed by means of pump P2 into the cell A through its lid inlet 9.

The rest of the equipment shown in FIGS. 5 and 6 comprises means for isolating the product of the electrolysis and recovering hydrocarbon solvent. Thus hydrocarbon solution of the product passes from the extractor S via a non-return valve V2 into a hydrocarbon stripper F consisting of a climbing film evaporator F2 and a subsidiary evaporator SF2 into which a stream of nitrogen is injected at N2. From the hydrocarbon stripper the product passes into reservoir Y and evaporated hydrocarbon is condensed into condenser C2 and $CO_2$ trap $T_2$ to be stored in reservoir H for recirculation by means of pump $P_3$ into extractor S.

The invention is illustrated but not limited by the following examples.

Example 1

The electrolysis cell shown in FIGS. 1–4 of the accompanying drawings was fitted with a cylindrical bright platinum anode (2 cm. diameter, 2 cm. length: 25 cm.$^2$) sandwiched at 3 to 4 mm. spacing between two stainless steel mesh cathodes. The cell was then fitted in to the apparatus shown in FIG. 6.

A methanol solution of methyl hydrogen glutarate (0.1 mole/100 ml.) and its sodium salt (0.05 mole/100 ml.) (total half-ester concentration 0.15 mole/100 ml. at 33% neutralisation) was charged into the cell and heated at reflux (66° C.) by circulating water from a controlled temperature reservoir through the heating coils of the cell. Further solution was pumped to the cell, passing to the climbing film evaporator E1 (FIG. 6) where the methanol was vapourised by steam-heating and was completely removed in a nitrogen counter-flow in subsidiary evaporator SE1. The methanol was recovered in condenser C1 and trap T1 and collected in the reservoir M. The "heavy" liquors were allowed to fall through the extractor S to the reservoir L and to mix with the recovered methanol in the mixer X prior to returning to the cell, via pump P2 at 450 ml./hour. Reservoir H and the product extraction system were charged with n-hexane.

After satisfactorily "filling" the apparatus, no further half-ester was added. The electrolysis cell volume was 140 ml. and, with 20 ml. heavy liquor held in L, 50 ml. methanol in M and 75 ml. of mixed solution in X, the system capacity was about 350 ml.

DC electric current was supplied to the cell at a steady rate of 2.5 amps (11 volts). Molten glutaric anhydride was pumped at 8.4 g./hour to the cell where it reacted with methanol to form methyl hydrogen glutarate. Methanol liquor from the mixer X was pumped to the cell at 450 ml./hour, overflowing to the evaporator E1. The methanol was condensed and collected in reservoir M. "Heavy" liquors, consisting of dimethyl suberate, dimethyl glutarate, methyl hydrogen glutarate, methyl sodium glutarate and minor constituents, fell through the column S meeting a 600 ml./hour counter-flow of n-hexane and collected in the reservoir L. From there the liquors flowed at a regulated rate, to mix with the regulated recovered methanol stream in the mixer X prior to re-cycle to the cell.

The hexane extract flowed to the evaporators F2 and SF2 where the solvent was stripped. The crude product collected in receiver Y and the hexane was recovered in reservoir H prior to recirculation via pump P3.

Samples for gas-liquid chromatography were taken periodically from the cell and the hexane stream (at point V2); having achieved steady concentrations of dimethyl suberate and dimethyl glutarate, the initial product in Y was discarded and collection of the product was started. The cell concentrations of dimethyl suberate and dimethyl glutarate were 4.3 g. and 0.8 g./100 ml. respectively.

After 4 hours at 2.5 amps, 11 volts and 66° C. cell temperature, the product was shown, by gas-liquid chromatography, to contain 2.6 g. methyl hydrogen glutarate, 3.3 g. dimethyl glutarate and 25.1 g. dimethyl suberate. The current efficiency was 68% (0.443 kwh./100 g. dimethyl suberate). The chemical efficiency, based on a feed of 33.9 g. glutaric anhydride and a half-ester concentration fall of 7.5 g. during the run was 76%. By a simple fractionation pure dimethyl suberate was isolated from the product.

Table 1 summarises further experiments in which dimethyl suberate was electrosynthesised continuously in the same apparatus as used in Example 1. In Examples 2–10 nickel cathodes were used. In Example 16 there was used a vitreous carbon anode of surface area considerably less than that of the platinum anode in Example 1.

TABLE I

| Example No. | Monoester conc. mole/ 100 ml. | Neutralisation, percent | Current density, A./cm.² | Volts | Monoester loss (mole) | Glutaric anhydride charged (mole) | Time (mins.) | Methyl hydrogen glutarate (mole) | Dimethyl glutarate (mole) | Dimethyl suberate (mole) | Current efficiency, percent | Chemical efficiency, percent | Kw.-hr./ kilo |
|---|---|---|---|---|---|---|---|---|---|---|---|---|---|
| 2 | 0.308 | 30 | 0.06 | 9 | 0 | 0.267 | 240 | 0.013 | 0.013 | 0.056 | 50 | | |
| 3 | 0.247 | 36 | 0.1 | 15 | 0.02 | 0.226 | 225 | 0.027 | 0.013 | 0.09 | 51 | 90 | 7.77 |
| 4 | 0.179 | 36 | 0.1 | 12 | 0 | 0.339 | 240 | 0.012 | 0.012 | 0.127 | 68 | 78 | 4.67 |
| 5 | 0.198 | 33 | 0.1 | 11 | 0.039 | 0.257 | 240 | 0.021 | 0.008 | 0.111 | 60 | 81 | 4.91 |
| 6 | 0.089 | 41 | 0.1 | 11.5 | 0 | 0.288 | 240 | | 0.01 | 0.117 | 62 | 81 | 4.89 |
| 7 | 0.075 | 45 | 0.1 | 11 | 0 | 0.267 | 220 | 0.028 | 0.004 | 0.093 | 56 | 78 | 5.36 |
| 8 | 0.247 | 22 | 0.1 | 16 | 0 | 0.267 | 240 | 0.015 | 0.003 | 0.10 | 56 | 80 | 7.88 |
| 9 | 0.315 | 20 | 0.06 | 12 | 0 | 0.297 | 260 | 0.10 | 0.015 | 0.07 | 58 | 80 | 5.53 |
| 10 | 0.144 | 20 | 0.06 | 9 | 0.027 | 0.226 | 240 | 0.075 | 0.014 | 0.067 | 58 | 80 | 4.03 |
| 11 | 0.261 | 26 | 0.08 | 11 | 0.041 | 0.277 | 240 | | 0.03 | 0.083 | 55 | | |
| 12 | 0.158 | 37 | 0.1 | 11 | 0.051 | 0.297 | 240 | 0.018 | 0.021 | 0.125 | 68 | 76 | 4.43 |
| 13 | 0.151 | 36 | 0.1 | 11.5 | | 0.380 | 255 | 0.011 | 0.014 | 0.135 | 68 | 74 | 4.58 |
| 14 | 0.103 | 40 | 0.1 | 12 | 0.036 | 0.257 | 210 | | | 0.094 | 58 | 70 | 5.50 |
| 15 | 0.144 | 36 | 0.1 | 11 | 0.051 | 0.257 | 210 | | 0.004 | 0.114 | 69 | 76 | 4.25 |
| 16 | 0.171 | 30 | 0.1 | 14 | | 0.092 | 240 | 0.011 | 0.0094 | 0.0416 | 68 | 90 | 4.25 |

We claim:
1. A process for the continuous synthesis of a product consisting of a diester of an aliphatic dicarboxylic acid having a chain of carbon atoms between its carboxylic groups said process comprising electrolysing in an electrolysis zone an alcoholic solution containing a monoester of an aliphatic dicarboxylic acid of lower molecular weight having between its carboxylic groups a chain of carbon atoms half as long as the chain in the product and a sodium or potassium salt of said monoester, the molecular ratio of said monoester to said salt being from 20:1 to 2:1, isolating product from the electrolyte in an isolation zone, returning alcohol and salt constituents of the electrolyte from the isolation zone to the electrolysis zone and continuously introducing into the electrolysis zone an anhydride of the said dicarboxylic acid of lower molecular weight to react with the alcohol and thereby maintain in the electrolyte a steady concentration of the monoester and salt thereof.

2. Process according to claim 1 wherein the said aliphatic dicarboxylic acid of lower molecular weight is succinic or glutaric acid.

3. Process according to claim 1 wherein the alcohol used as solvent is methanol.

4. Process according to claim 1 wherein the electrolysis is operated at a temperature of from 40° to 100° C.

5. Process according to claim 1 wherein the molecular ratio of said monoester to said salt in the alcoholic solution is from 2:1 to 1:1.

6. Process according to claim 1 wherein isolation of the product is carried out by direct extraction of the electrolyte with a hydrocarbon solvent with which the solvent alcohol is not miscible, and unextracted residues are recycled to the electrolysis zone.

7. Process according to claim 1 wherein isolation of the product is carried out by direct extraction of the electrolyte with a hydrocarbon solvent with which the solvent alcohol is not miscible, and unextracted residues are recycled to the electrolysis zone.

8. Process according to claim 3 wherein isolation of the product is carried out by direct extraction of the electrolyte with a hydrocarbon solvent with which the solvent alcohol is not miscible, and unextracted residues are recycled to the electrolysis zone.

9. Process according to claim 8 wherein said hydrocarbon solvent is cyclohexane.

10. Process according to claim 4 wherein isolation of the product is carried out by direct extraction of the electrolyte with a hydrocarbon solvent with which the solvent alcohol is not miscible, and unextracted residues are recycled to the electrolysis zone.

11. Process according to claim 5 wherein isolation of the product is carried out by direct extraction of the electrolyte with a hydrocarbon solvent with which the solvent alcohol is not miscible, and unextracted residues are recycled to the electrolysis zone.

References Cited

UNITED STATES PATENTS 3,313,717    4/1967    Kuwata et al.     204—79

F. C. EDMUNDSON, Primary Examiner